Nov. 8, 1927.

L. ANDRUSZKIEWICZ

DEVICE TO HOLD COWS' TAILS

Filed May 24, 1926

1,648,159

INVENTOR
Leon Andruszkiewicz
BY
ATTORNEY

Patented Nov. 8, 1927.

1,648,159

UNITED STATES PATENT OFFICE.

LEON ANDRUSZKIEWICZ, OF THORP, WISCONSIN.

DEVICE TO HOLD COWS' TAILS.

Application filed May 24, 1926. Serial No. 111,107.

This invention relates generally to a cow's milking device, the invention having more particular reference to a novel type of device to hold a cow's tail during milking.

An object of the invention is the provision of an improved device, to hold a cow's tail during milking, of simple construction and novel arrangement.

For further comprehension of the invention, and of the objects and advantages thereof, reference will be had to the following description and accompanying drawing, and to the appended claims in which the various novel features of the invention are more particularly set forth.

Fig. 1, of the drawing, is a top plan view of my improved device to hold a cow's tail during milking.

As here embodied my improved device to hold a cow's tail during milking, comprises a flexible member, preferably of spring steel or the like, having a looped portion 10, with its extremity, formed or bent, outwardly, as at 11, and preferably curved inwardly, at its extreme extremity, as at 12.

The said looped portion 10, is of suitable size, to be engaged around one of the hind legs of a cow being milked, and a tail engaging portion hereafter referred to is of suitable size, to be engaged around the said cow's tail, and hold it firmly, to prevent the cow from switching it and thus annoying the person milking her.

Figure 1:
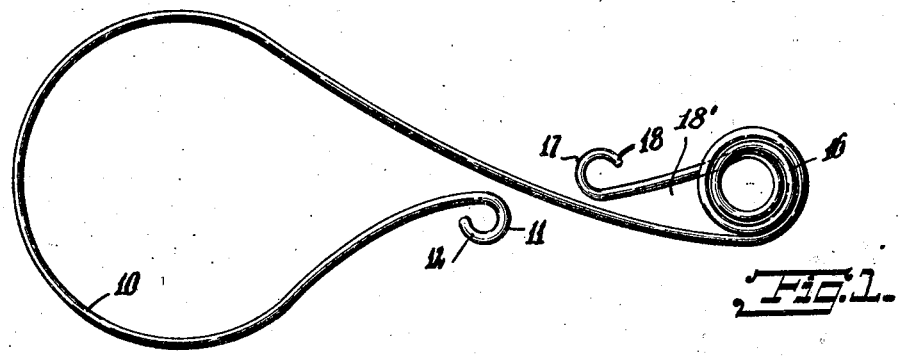
Figure 2:
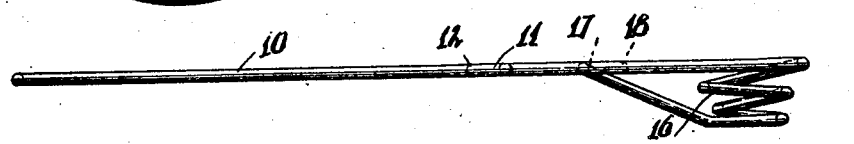
Fig. 2, is a side elevational view thereof.

Referring in particular to Figs. 1 and 2 of the accompanying drawing, I have illustrated a tail engaging portion 16, suitably formed, bent, or wound, in a plurality of coils, preferably spiral wound, depending downward from the said looped portion 10, and having its extremity, formed or bent outwardly, as at 17, and in line with, or in the same plane, as the said looped portion 10, preferably curved inwardly, at its extreme extremity, as at 18.

Figure 3:
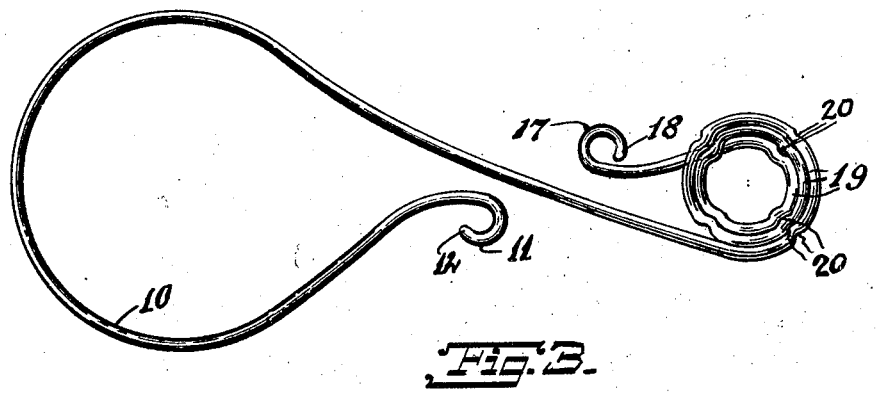
Fig. 3, is a top plan view illustrating another form of my improved device to hold a cow's tail during milking.
Figure 4:
Fig. 4, is a side elevational view thereof.

Referring in particular to Figs. 3 and 4 I have illustrated another form of my improved device, in which the tail engaging portion 19, is suitably formed, bent, or wound in a plurality of coils, preferably spiral wound, depending downward from the said looped portion 10, and inclined inwardly thereto, and provided with a plurality of inwardly curved portions 20. In order to prevent painful gripping of the shank portion of the cow's tail, sufficient space is provided within the loop indicated by the numeral 18' to accommodate the shank portion. The hair portion of the cow's tail may be disposed between the superimposed helical sections and firmly gripped therebetween without materially affecting the cow. It should be understood that the loop loosely engages the shank portion of the cow's tail and properly positions the hair portion thereof so that it may be interwoved between the helical sections and that the inwardly disposed portions 20 of the helical member aid in retaining the hair of the tail engaged between said helical sections.

Having thus described my invention, what I claim as new and desire to protect by Letters Patent of the United States is as follows:

1. A device for holding a cow's tail during milking comprising a forward loop portion adapted to be clamped on the hind leg of the cow, a spiral at one extremity of said device adapted to firmly grip the hair portion of the cow's tail, and a loop intermediate said forward loop and said spiral adapted to loosely engage the shank portion of a cow's tail for suitably positioning the hair portions thereof to be gripped between adjacent sections of said spiral.

2. A device for holding a cow's tail during milking comprising a resilient member disposed in the form of a loop at the forward end adapted to be clamped on the hind leg of a cow, a spiral formed on a rearward extension of said resilient member comprising superimposed turns of said resilient member intermediate the extremities thereof adapted to securely hold the hair portion of the cow's tail, the rear extremity of said resilient member being disposed forwardly in spaced relation to the rearward extension thereof adapted to loosely engage the shank portion of the cow's tail for suitably positioning the hair portion thereof to be gripped between adjacent turns of said spiral.

3. A device for holding a cow's tail during milking, comprising a forward loop adapted to be clamped on the hind leg of a cow, a spiral on said device comprising superimposed spiral sections having inwardly disposed portions thereon for firmly gripping the hair portion of the cow's tail, and means on said device for suitably positioning the hair portion of the tail to be gripped between adjacent sections of said spiral.

In testimony whereof I have affixed my signature.

LEON ANDRUSZKIEWICZ.